United States Patent
White

(10) Patent No.: US 9,542,108 B2
(45) Date of Patent: Jan. 10, 2017

(54) EFFICIENT MIGRATION OF VIRTUAL STORAGE DEVICES TO A REMOTE NODE USING SNAPSHOTS

(71) Applicant: Scale Computing, Inc., Indianapolis, IN (US)

(72) Inventor: Philip Andrew White, San Francisco, CA (US)

(73) Assignee: Scale Computing, Inc., Indianapolis, IN (US)

( * ) Notice: Subject to any disclaimer, the term of this patent is extended or adjusted under 35 U.S.C. 154(b) by 134 days.

(21) Appl. No.: 14/320,427

(22) Filed: Jun. 30, 2014

(65) Prior Publication Data

US 2015/0378623 A1    Dec. 31, 2015

(51) Int. Cl.
| | |
|---|---|
| *G06F 12/16* | (2006.01) |
| *G06F 3/06* | (2006.01) |
| *G06F 9/50* | (2006.01) |
| G06F 17/30 | (2006.01) |
| G06F 11/14 | (2006.01) |

(52) U.S. Cl.
CPC ............. *G06F 3/0619* (2013.01); *G06F 3/065* (2013.01); *G06F 3/067* (2013.01); *G06F 3/0647* (2013.01); *G06F 9/5088* (2013.01); G06F 11/1456 (2013.01); G06F 17/30088 (2013.01)

(58) Field of Classification Search
None
See application file for complete search history.

(56) References Cited

U.S. PATENT DOCUMENTS

| | | | | |
|---|---|---|---|---|
| 8,161,254 B2* | 4/2012 | Liu | ..................... | G06F 11/1451 711/162 |
| 2003/0101321 A1* | 5/2003 | Ohran | ................. | G06F 11/1451 711/162 |
| 2010/0185587 A1* | 7/2010 | Lovinger | .......... | G06F 17/30079 707/660 |
| 2012/0266018 A1* | 10/2012 | Tanaka | ................ | G06F 11/2097 714/19 |
| 2013/0054530 A1* | 2/2013 | Baker | ............... | G06F 17/30079 707/639 |

* cited by examiner

*Primary Examiner* — Duc Doan
(74) *Attorney, Agent, or Firm* — Zilka-Kotab, PC

(57) ABSTRACT

A system, method, and computer program product are provided for performing fast migration of a virtual resource from one node to another node. The method includes the steps of receiving a first request to migrate a resource from a first node to a second node, transmitting a second request to the second node to create a new instance of the resource, collecting a set of changes associated with the resource in a data structure, and transmitting the data structure that includes the set of changes to the second node. The second node generates the new instance of the resource based on a snapshot of the resource captured by the first node at a previous point in time and updates the new instance of the resource based on the set of changes such that the new instance of the resource on the second node matches the resource on the first node.

20 Claims, 9 Drawing Sheets

US 9,542,108 B2

EFFICIENT MIGRATION OF VIRTUAL STORAGE DEVICES TO A REMOTE NODE USING SNAPSHOTS

FIELD OF THE INVENTION

The present invention relates to virtual machines, and more particularly to a technique for migrating virtual storage devices between nodes.

BACKGROUND

Modern systems that implement a plurality of virtual machines running on separate nodes may include functionality to copy a virtual resource such as a virtual storage device from one node to a different node. Migration of the resource thereby enables the resource to be utilized by a different virtual machine running on different hardware. However, such resources may be extremely large and the data that represents the resource may need to be transported over a network infrastructure. This data transfer may take hours or days to be copied from one node to another node. Thus, there is a need for addressing this issue and/or other issues associated with the prior art.

SUMMARY

A system, method, and computer program product are provided for performing fast migration of a virtual resource from one node to another node. The method includes the steps of receiving a first request to migrate a resource from a first node to a second node, transmitting a second request to the second node to create a new instance of the resource, collecting a set of changes associated with the resource in a data structure, and transmitting the data structure that includes the set of changes to the second node. The second node generates the new instance of the resource based on a snapshot of the resource captured by the first node at a previous point in time and updates the new instance of the resource based on the set of changes such that the new instance of the resource on the second node matches the resource on the first node.

DETAILED DESCRIPTION

Virtual resources such as a virtual storage device may be implemented on particular nodes of a system that includes a plurality of nodes. During operation, the virtual resources may need to be moved from one node to another node such that the virtual resource is implemented by different hardware. Such operations may be referred to as a migration operation.

Migration operations typically take a long time due to the nature of the large amount of data that is being transferred from one node to another node. However, some systems also implement a system for creating backup versions of such resources called snapshots. A snapshot is a copy of all of the data for a resource at a particular point in time. The snapshots may be stored in different nodes so that if a node fails, the snapshot can be used to restore a resource on that node or a different node such that the data in the resource is not lost. Migration operations may take advantage of these snapshots in order to reduce the time required to perform the migration operation.

Figure 1:
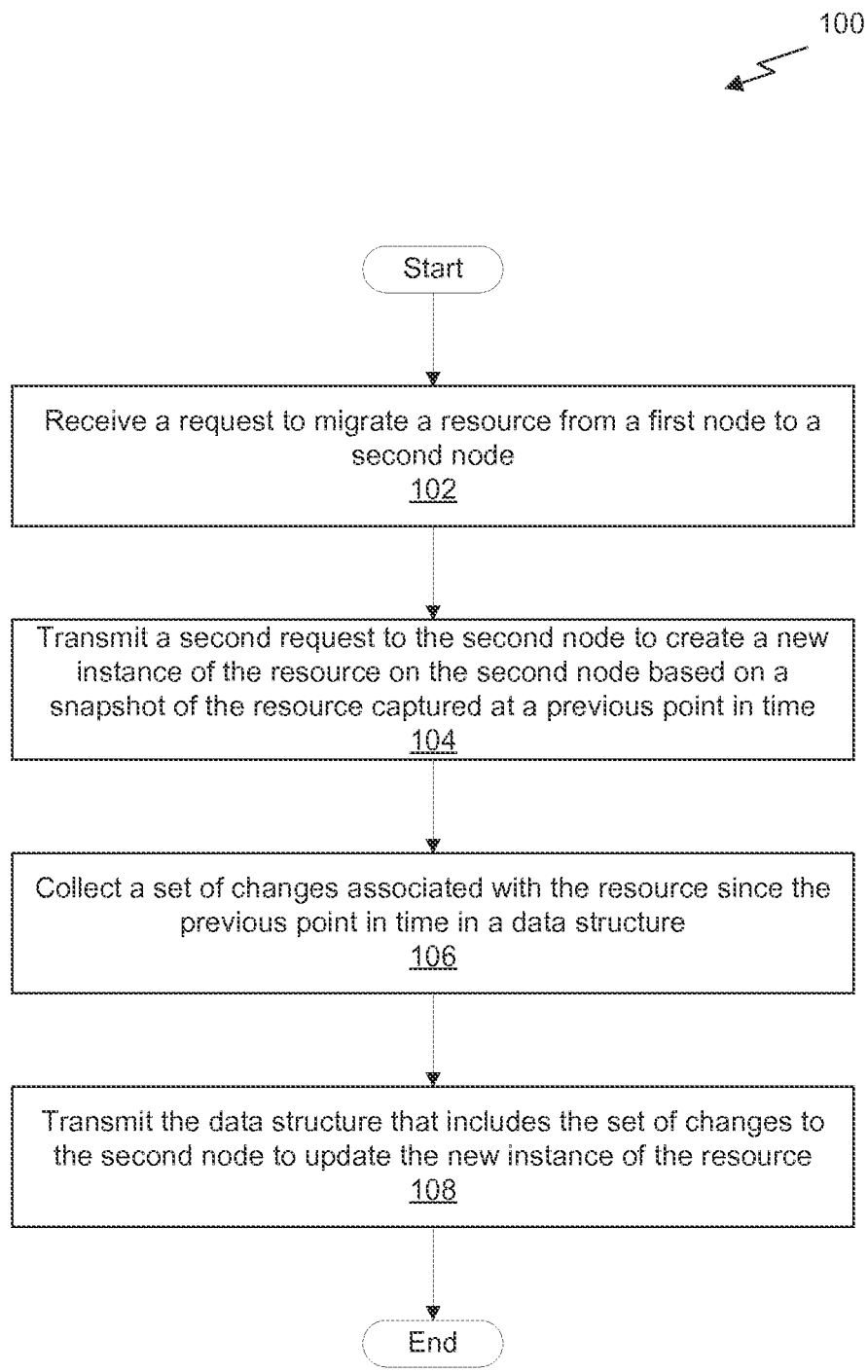
FIG. 1 illustrates a flowchart of a method for migrating a virtual resource from a first node to a second node, according to one embodiment.

FIG. 1 illustrates a flowchart of a method 100 for migrating a virtual resource from a first node to a second node, according to one embodiment. Although the method 100 is described in the context of a program executed by a processor, the method 100 may also be performed by custom circuitry or by a combination of custom circuitry and a program. At step 102, a request is received to migrate a resource from a first node to a second node. In one embodiment, the resource is a virtual storage device that maps blocks of one or more physical storage devices to a contiguous address space. In other embodiments, the resource may be a virtual machine or some other type of data structure comprising state and data stored in a memory.

At step 104, a request is transmitted to the second node to create a new instance of the resource. The second node, in response to receiving the request, is configured to generate the new instance of the resource in a memory associated with the second node based on a snapshot of the resource captured by the first node at a previous point in time and stored in the memory associated with the second node. The snapshot comprises a data structure that represents a copy of the resource on the first node at the previous point in time. In one embodiment, the snapshot may contain a reference to a previous snapshot as well as data that represents any changes to the resource since the previous snapshot was captured.

At step 106, the first node collects a set of changes made to the resource since the previous point in time in a data structure. The data structure may comprise zero or more changes. In the context of the present description, a change refers to a command and/or data that represents any modification to the resource. For example, a request to write data to a virtual storage device comprises a change that is stored in the data structure. At step 108, the data structure that includes the set of changes is transmitted to the second node to update the new instance of the resource. The second node is configured to apply the set of changes to the new instance of the resource such that the original resource on the first node matches the new instance of the resource on the second node.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
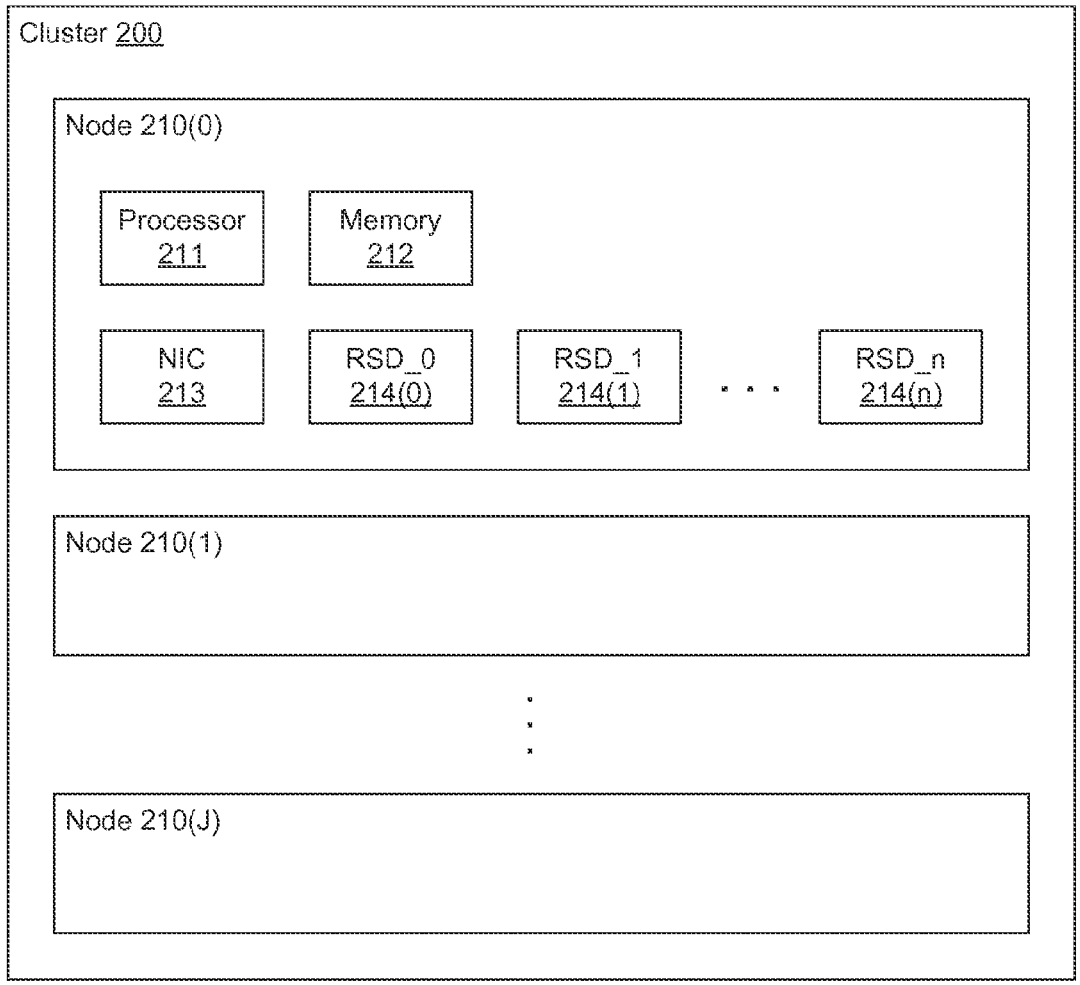
FIG. 2 illustrates a cluster having a plurality of nodes, in accordance with one embodiment.

FIG. 2 illustrates a cluster 200 having a plurality of nodes 210, in accordance with one embodiment. As shown in FIG. 2, the cluster 200 includes/nodes (i.e., node 210(0), node 210(1), . . . , node 210(J-1)). Each node 210 includes a processor 211, a memory 212, a NIC 213, and one or more real storage devices (RSD) 214. The processor 211 may be an x86-based processor, a RISC-based processor, or the like. The memory 212 may be a volatile memory such as a Synchronous Dynamic Random-Access Memory (SDRAM) or the like. The NIC 213 may implement a physical layer and media access control (MAC) protocol layer for a network interface. The physical layer may correspond to various physical network interfaces such as IEEE (Institute of Electrical and Electronics Engineers) 802.3 (Ethernet), IEEE 802.11 (WiFi), and the like. In one embodiment, the memory 212 includes a host operating system kernel, one or more device drivers, one or more applications, and the like. The host operating system kernel may be, e.g., based on the Linux® kernel such as the Red Hat® Enterprise Linux (RHEL) distribution. It will be appreciated that, although not explicitly shown, each node 210 may include one or more other devices such as GPUs, additional microprocessors, displays, radios, or the like.

As used herein an RSD 214 is a physical, non-volatile memory device such as a HDD, an optical disk drive, a solid state drive, a magnetic tape drive, and the like that is capable of storing data. The one or more RSDs 214 may be accessed via an asynchronous input/output functionality implemented by a standard library of the host operating system or accessed via a non-standard library that is loaded by the operating system, in lieu of or in addition to the standard library. In one embodiment, the host operating system may mount the RSDs 214 and enable block device drivers to access the RSDs 214 for read and write access.

The RSDs 214 may implement a file system including, but not limited to, the FAT32 (File Allocation Table—32-bit) file system, NTFS (New Technology File System), or the ext2 (extended file system 2). In one embodiment, each RSD 214 may implement logical block addressing (LBA). LBA is an abstraction layer that maps blocks of the disk (e.g., 512B blocks of a hard disk) to a single unified address. The unified address may be 28-bit, 48-bit, or 64-bit wide that can be mapped, e.g., to a particular cylinder/head/sector tuple of a conventional HDD or other data storage space.

The memory 212 may also include a hypervisor that performs hardware virtualization. In one embodiment, QEMU (Quick EMUlator) is provided for emulating one or more VMs on each node of the cluster 200. In such embodiments, each node 210 may be configured to load a host operating system such as RHEL into the memory 212 on boot. Once the host operating system is running, the QEMU software is launched in order to instantiate one or more VMs on the node 210, each VM implementing a guest operating system that may or may not be the same as the host operating system. It will be appreciated that QEMU may generate VMs that can emulate a variety of different hardware architectures such as x86, PowerPC, SPARC, and the like.

Figure 3A:
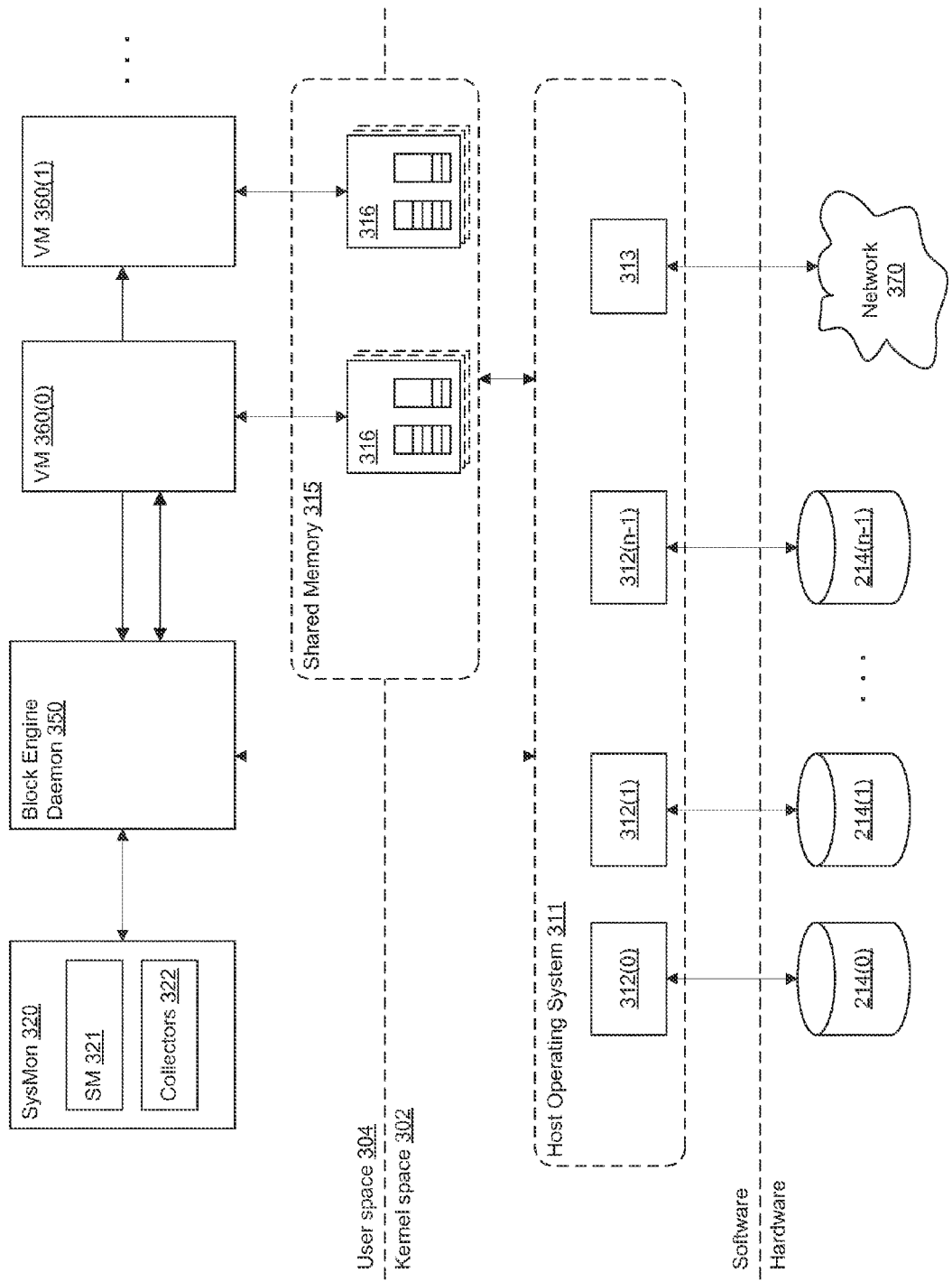
FIGS. 3A & 3B are conceptual diagrams of the architecture for a node of FIG. 2, in accordance with one embodiment.
Figure 3B:
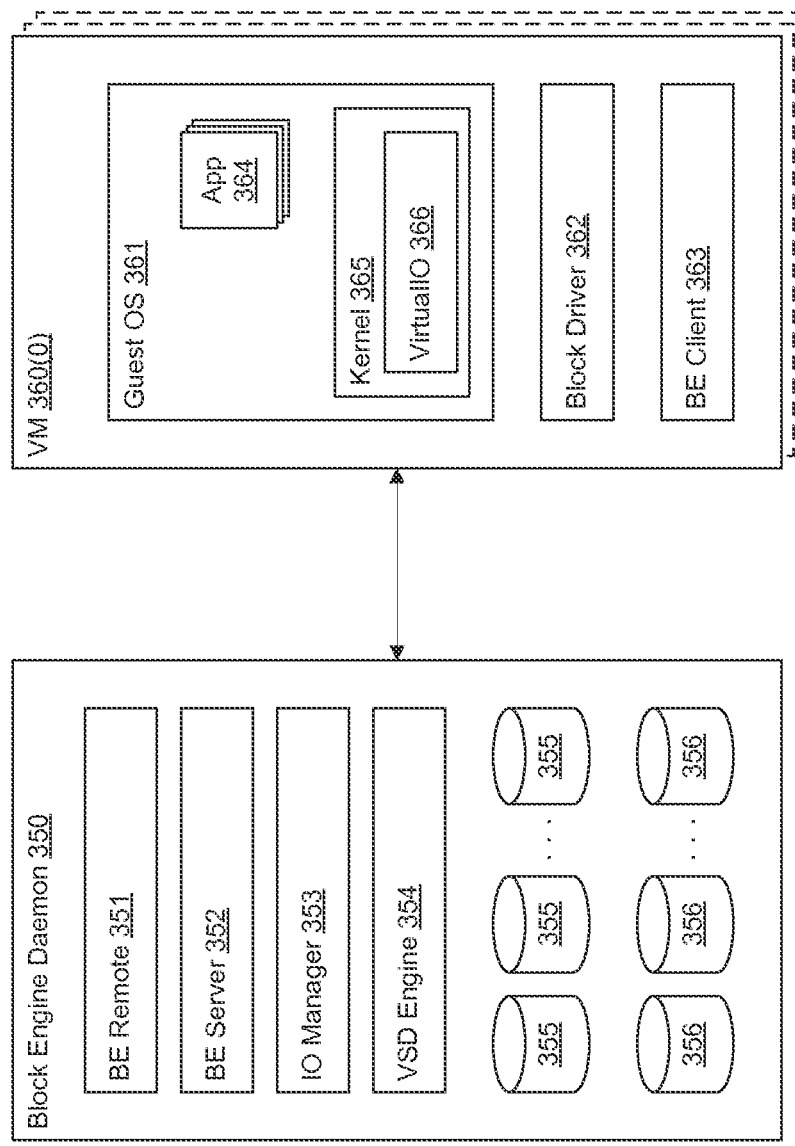

FIGS. 3A & 3B are conceptual diagrams of the architecture for a node 210 of FIG. 2, in accordance with one embodiment. As shown in FIG. 3A, the node 210 may execute a host operating system 311 that implements a protected mode of operation having at least two privilege levels including a kernel space 302 and a user space 304. For example, the host operating system 311 may comprise the Linux® kernel as well as one or more device drivers 312 and 313 that execute in the kernel space 302. The device drivers 312 enable applications in the user space 304 to read or write data from/to the RSDs 214 via a physical interface such as SATA (serial ATA), SCSI (Small Computer System Interface), FC (Fibre Channel), and the like. In one embodiment, the device drivers 312 are generic block device drivers included in the host operating system 311. The device driver 313 enables applications to communicate with other nodes 210 in the cluster 200 via a network interface, which may be wired (e.g., SONET/SDH, IEEE 802.3, etc.) or wireless (e.g., IEEE 802.11, etc.). In one embodiment, the device driver 313 is a generic network driver included in the host operating system 311.

The conceptual diagram in FIG. 3A shows the RSDs 214 and network 370 within the hardware abstraction layer. In other words, the RSDs 214 and network 370 comprise physical devices having a physical interface to the processor 211 in the node 210, either directly or indirectly through a system bus or bridge device. FIG. 3A also illustrates a software abstraction layer that includes objects and processes resident in the memory 212 of the node 210. The processes may be executed by the processor 211. For example, the host operating system 311, system monitor (SysMon) 320, Block Engine (BE) Daemon 350, and virtual machines (VMs) 360 are processes that are executed by the processor 211.

In one embodiment, the host operating system 311 may allocate a portion of the memory 212 as a shared memory 315 that is accessible by the one or more VMs 360. The VMs 360 may share data in the shared memory 315. The host operating system 311 may execute one or more processes configured to implement portions of the architecture for a node 210. For example, the host operating system 311 executes the BE Daemon 350 in the user space 304. The BE Daemon 350 is a background process that performs tasks related to the block devices coupled to the node 210 (i.e., the RSDs 214). The SysMon 320 implements a state machine (SM) 321 and a set of collectors 322 for managing the instantiation and execution of one or more VMs 360 that are executed in the user space 304. In addition, the SysMon 320 may be configured to manage the provisioning of virtual storage devices (VSDs). VSDs may be mounted to the VMs 360 to provide applications running on the VMs 360 access to the RSDs 214 even though the applications executed by the VMs 360 cannot access the RSDs 214 directly. In one embodiment, the SysMon 320 creates I/O buffers 316 in the shared memory 315 that enable the VMs 360 to read data from or write data to the VSDs mounted to the VM 360. Each VM 360 may be associated with multiple I/O buffers 316 in the shared memory 315. For example, each VSD mounted to the VM 360 may be associated with an input buffer and an output buffer, and multiple VSDs may be mounted to each VM 360.

As shown in FIG. 3B, each instance of the VM 360 implements a guest operating system 361, a block device driver 362, and a block engine client 363. The guest OS 361 may be the same as or different from the host operating system 311. The guest OS 361 comprises a kernel 365 that implements a virtual I/O driver 366 that is logically coupled to a VSD. Each VSD is a logical storage device that maps non-contiguous blocks of storage in one or more RSDs 214 to a contiguous, logical address space of the VSD. The VSD logically appears and operates like a real device coupled to a physical interface for the guest OS 361, but is actually an abstraction layer between the guest OS 361 and the physical storage blocks on the RSDs 214 coupled to the node 210, either directly or indirectly via the network 370. The guest OS 361 may execute one or more applications 364 that can read and write data to the VSD via the virtual I/O driver 366. In some embodiments, two or more VSDs may be associated with a single VM 360.

The block device driver 362 and the BE client 363 implement a logical interface between the guest OS 361 and the VSD. In one embodiment, the block device driver 362 receives read and write requests from the virtual I/O driver 366 of the guest OS 361. The block device driver 362 is configured to write data to and read data from the corresponding I/O buffers 316 in the shared memory 315. The BE client 363 is configured to communicate with the BE server 352 in the BE Daemon 350 to schedule I/O requests for the VSDs.

The BE Daemon 350 implements a Block Engine Remote Protocol 351, a Block Engine Server 352, an I/O Manager 353, and a VSD Engine 354. The Block Engine Remote Protocol 351 provides access to remote RSDs 214 coupled to other nodes 210 in the cluster 200 via the network 370. The BE Server 352 communicates with one or more BE Clients 363 included in the VMs 360. Again, the BE Client 363 generates I/O requests related to one or more VSDs for the BE Server 352, which then manages the execution of those requests via either the Block Engine Remote Protocol 351 (for RSDs 214 connected to other nodes 210 accessible via the network 370) or the I/O Manager 353 (for RSDs 214 connected to the node 210). The I/O Manager 353 enables the BE Daemon 350 to generate asynchronous UO operations that are handled by the host OS 311 to read from or write data to the RSDs 214 connected to the node 210. Functions implemented by the I/O Manager 353 enable the BE Daemon 350 to schedule I/O requests for one or more VMs 360 in an efficient manner.

In one embodiment, the BE Daemon 350 also implements a VSD Engine 354. The VSD Engine 354 maintains state and metadata associated with a plurality of VSD objects 355. Each VSD object 355 may include a mapping table that associates each block of addresses (i.e., an address range) in the VSD with a corresponding block of addresses in one or more RSDs 214. The VSD objects 355 may include various state associated with a VSD such as a VSD identifier (i.e., handle), a base address of the VSD object 355 in the memory 212, a size of the VSD, a format of the VSD (e.g., filesystem, block size, etc.), and the like.

The VSD Engine 354 may also maintain state and metadata associated with a plurality of RSD objects 356. Each RSD object 356 may correspond to an RSD 214 connected to the node 210 or an RSD 214 accessible on another node 210 via the network 370. The RSD objects 356 may include various state associated with the RSDs 214 such as an RSD identifier (i.e., handle), a base address of the RSD object 356 in the memory 212, a size of the RSD 214, a format of the RSD 214 (e.g., filesystem, block size, etc.), and the like. The RSD object 214 may also track errors associated with the RSD 214.

The VSD objects 355 and the RSD objects 356 are abstraction layers implemented by the VSD Engine 354 that enable VMs 360, via the BE Daemon 350, to store data on the RSDs 214. In one embodiment, the VSD abstraction layer is a set of objects defined using an object-oriented programming (OOP) language. As used herein, an object is an instantiation of a class and comprises a data structure in memory that includes fields and pointers to methods implemented by the class. The VSD abstraction layer defines a VSD class that implements a common interface for all VSD objects that includes the following methods: Create; Open; Close; Read; Write; Flush; Discard; and a set of methods for creating a snapshot of the VSD. A snapshot is a data structure that stores the state of the VSD at a particular point in time. The Create method generates the metadata associated with a VSD and stores the metadata on an RSD 214, making the VSD available to all nodes 210 in the cluster 200. The Open method enables applications in the VMs 360 to access the VSD (i.e., the I/O buffers 316 are generated in the shared memory 315 and the VSD is mounted to the guest OS 361). The Close method prevents applications in the VMs 360 from accessing the VSD. The Read method enables the BE Server 352 to read data from the VSD. The Write method enables the BE Server 352 to write data to the VSD. The Flush method flushes all pending I/O requests associated with the VSD. The Discard method discards a particular portion of data stored in memory associated with the VSD.

In one embodiment, two types of VSD objects 355 inherit from the generic VSD class: a SimpleVSD object and a ReliableVSD object. The SimpleVSD object is a simple virtual storage device that maps each block of addresses in the VSD to a single, corresponding block of addresses in an RSD 214. In other words, each block of data in the SimpleVSD object is only stored in a single location. The SimpleVSD object provides a high performance virtual storage solution but lacks reliability. In contrast, the ReliableVSD object is a redundant storage device that maps each block of addresses in the VSD to two or more corresponding blocks in two or more RSDs 214. In other words, the ReliableVSD object provides n-way replicated data and metadata. The ReliableVSD object may also implement error checking with optional data and/or metadata checksums. In one embodiment, the ReliableVSD object may be configured to store up to 15 redundant copies (i.e., 16 total copies) of the data stored in the VSD. The SimpleVSD object may be used for non-important data while the ReliableVSD object attempts to store data in a manner that prevents a single point of failure (SPOF) as well as provide certain automatic recovery capabilities when one or more nodes experiences a failure. The VSD Engine 354 may manage multiple types of VSD objects 355 simultaneously such that some data may be stored on SimpleVSD type VSDs and other data may be stored on ReliableVSD type VSDs. It will be appreciated that the two types of VSDs described herein are only two possible examples of VSD objects inheriting from the VSD class and other types of VSD objects 355 are contemplated as being within the scope of the present disclosure.

The VSD Engine 354 may also implement an RSD abstraction layer that provides access to all of the RSDs 214 coupled to the one or more nodes 210 of the cluster 200. The RSD abstraction layer enables communications with both local and remote RSDs 214. As used herein, a local RSD is an RSD 214 included in a particular node 210 that is hosting the instance of the BE Daemon 350. In contrast, a remote RSD is an RSD 214 included in a node 210 that is not hosting the instance of the BE Daemon 350 and is accessible via a network 370. The RSD abstraction layer provides reliable communications as well as passing disk or media errors from both local and remote RSDs 214 to the BE Daemon 350.

In one embodiment, the RSD abstraction layer is a set of objects defined using an OOP language. The RSD abstraction layer defines an RSD class that implements a common interface for all RSD objects 356 that includes the following methods: Read; Write; Allocate; and UpdateRefCounts. Each RSD object 356 is associated with a single RSD 214. In one embodiment, the methods of the RSD class are controlled by a pair of state machines that may be triggered by either the reception of packets from remote nodes 210 on the network 370 or the expiration of timers (e.g., interrupts). The Read method enables BE Server 352 to read data from the RSD 214. The Write method enables BE Server 352 to write data to the RSD 214. The Allocate method allocates a block of memory in the RSD 214 for storing data. The UpdateRefCounts method updates the reference counts for each block of the RSD 214, enabling deallocation of blocks with reference counts of zero (i.e., garbage collection).

In one embodiment, two types of RSD objects 356 inherit from the RSD class: an RSDLocal object and an RSDRemote object. The RSDLocal object implements the interface defined by the RSD class for local RSDs 214, while the RSDRemote object implements the interface defined by the RSD class for remote RSDs 214. The main difference between the RSDLocal objects and the RSDRemote objects are that the I/O Manager 353 asynchronously handles all I/O between the BE Server 352 and local RSDs 214, while the BE Remote Protocol 351 handles all I/O between the BE Server 352 and remote RSDs 214.

As discussed above, the SysMon 320 is responsible for the provisioning and monitoring of VSDs. In one embodiment, the SysMon 320 includes logic for generating instances of the VSD objects 355 and the RSD objects 356 in the memory 212 based on various parameters. For example, the SysMon 320 may discover how many RSDs 214 are connected to the nodes 210 of the cluster 200 and create a different RSD object 356 for each RSD 214 discovered. The SysMon 320 may also include logic for determining how many VSD objects should be created and or shared by the VMs 360 implemented on the node 210. Once the SysMon 320 has generated the instances of the VSD objects 355 and the RSD objects 356 in the memory 212, the BE Daemon 350 is configured to manage the functions of the VSDs and the RSDs 214.

Figure 4:
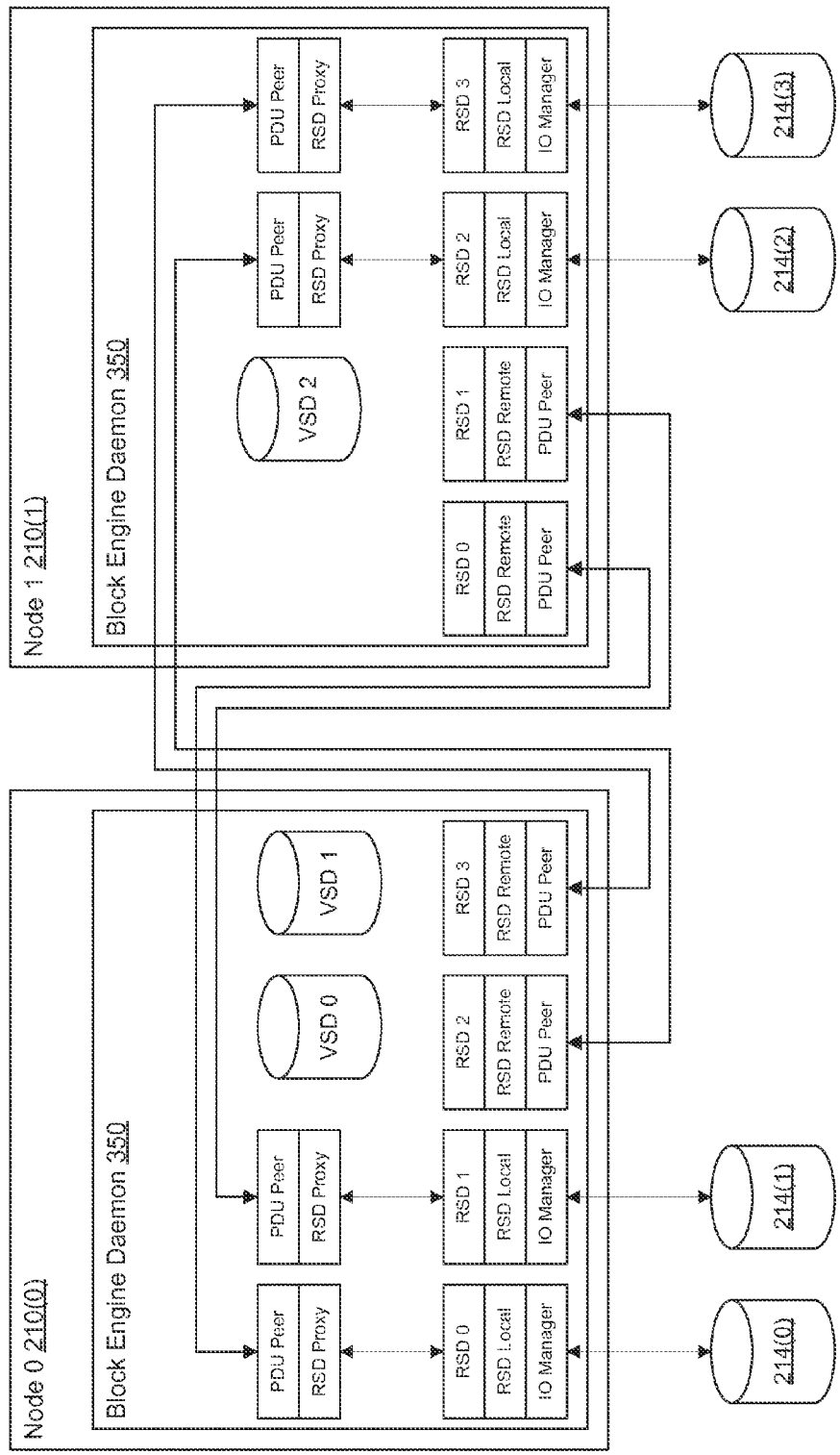
FIG. 4 illustrates the abstraction layers implemented by the block engine daemon for two nodes of the cluster, in accordance with one embodiment.

FIG. 4 is a conceptual diagram of the abstraction layers implemented by the BE Daemon 350 for two nodes 210 of the cluster 200, in accordance with one embodiment. A first node 210(0) is coupled to two local RSDs (i.e., 214(0) and 214(1)) and two remote RSDs (i.e., 214(2) and 214(3)) via the network 370. Similarly, a second node 210(1) is coupled to two local RSDs (i.e., 214(2) and 214(3)) and two remote RSDs (i.e., 214(0) and 214(1)) via the network 370. The RSD abstraction layer includes four RSD objects 356 (i.e., RSD 0, RSD 1, RSD 2, and RSD 3). In the first node 210(0), RSD 0 and RSD 1 are RSDLocal objects and RSD 2 and RSD 3 are RSDRemote objects.

The first node 210(0) accesses the first RSD 214(0) and the second RSD 214(1) via the I/O Manager library that makes system calls to the host operating system 311 in order to asynchronously read or write data to the local RSDs 214. An RSDLocal library is configured to provide an interface for applications communicating with the BE Daemon 350 to read or write to the local RSDs 214. The RSDLocal library may call methods defined by the interface implemented by the IOManager library. The first node 210(0) accesses the third RSD 214(2) and the fourth RSD 214(3) indirectly via a Protocol Data Unit Peer (PDUPeer) library that makes system calls to the host operating system 311 in order to communicate with other nodes 210 using the NIC 213. The PDUPeer library generates packets that include I/O requests for the remote RSDs (e.g., 214(2) and 214(3)). The packets may include information that specifies the type of request as well as data or a pointer to the data in the memory 212. For example, a packet may include data and a request to write the data to one of the remote RSDs 214. The request may include an address that specifies a block in the RSD 214 to write the data to and a size of the data. Alternately, a packet may include a request to read data from the remote RSD 214. The RSDProxy library unpacks requests from the packets received from the PDUPeer library and transmits the requests to the associated local RSD objects 356 as if the requests originated within the node 210.

The BE Remote Protocol 351, the BE Server 352, and the I/O Manager 353 implement various aspects of the RSD abstraction layer shown in FIG. 4. For example, the BE Remote Protocol 351 implements the RSDRremote library, RSDProxy library, and the PDUPeer library and the I/O Manager 353 implements the RSDLocal library and the IOManager library. The second node 210(1) is configured similarly to the first node 210(0) except that the RSD objects 356 RSD 0 and RSD 1 are RSDRemote objects linked to the first RSD 214(0) and the second RSD 214(1), respectively, and the RSD objects 356 RSD 2 and RSD 3 are RSDLocal objects linked to the third RSD 214(2) and the fourth RSD 214(3), respectively.

The VSD abstraction layer includes three VSD objects 355 (i.e., VSD 0, VSD 1, and VSD 2). In the first node 210(0), VSD 0 and VSD 1 are ReliableVSD objects. In the second node 210(1), VSD 2 is a ReliableVSD object. It will be appreciated that one or more of the VSD objects 355 may be instantiated as SimpleVSD objects, and that the particular types of objects chosen depends on the characteristics of the system. Again, the VSD objects 355 provide an interface to map I/O requests associated with the corresponding VSD to one or more corresponding I/O requests associated with one or more RSDs 214. The VSD objects 355, through the Read or Write methods, are configured to translate the I/O request received from the BE Server 352 and generate corresponding I/O requests for the RSD(s) 214 based on the mapping table included in the VSD object 355. The translated I/O request is transmitted to the corresponding RSD 214 via the Read or Write methods in the RSD object 356.

Figure 5A:
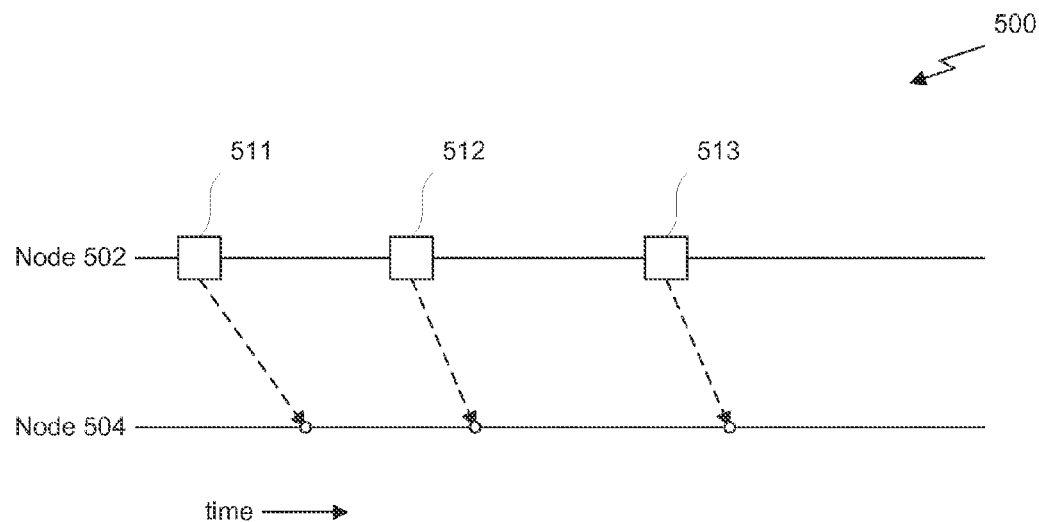
FIG. 5A is a conceptual diagram for a system configured to create snapshots of a VSD, in accordance with one embodiment.

FIG. 5A is a conceptual diagram for a system 500 configured to create snapshots of a VSD, in accordance with one embodiment. The system 500 includes a first node 502 and a second node 504. The system 500 may be configured to capture snapshots of a VSD associated with the first node 502 and transfer the snapshots to the second node 504 in order to keep a backup of the VSD in case the first node 502 crashes. As used herein, a snapshot is a data structure that represents a copy of all of the data associated with the VSD at a particular point in time. In other words, the snapshot includes both the metadata associated with the VSD stored in the VSD object 355 and the data stored in one or more RSDs 214 that are referenced in the mapping table of the VSD object 355. In one embodiment, the first snapshot of the VSD may comprise a complete copy of all of the data in the VSD. Subsequent snapshots of the VSD may comprise only that data in the VSD that has changed since a point in time when the last snapshot was captured as well as a reference pointer to the last snapshot such that the VSD can be reconstructed through a chain of one or more previous snapshots. By only storing the changed data in the subsequent snapshots, less disk capacity may be required.

In one embodiment, the hypervisor 320 may be configured to create snapshots of the VSDs on a particular node and transmit the snapshots to other nodes in the cluster 200 as a backup. The hypervisor 320 on one node may communicate with the hypervisor 320 on other nodes to perform these functions.

As shown in FIG. 5A, at a first point in time, an operation to capture a first snapshot 511 of the VSD may be initiated on the first node 502. The first node 502 captures the snapshot of the VSD and transmits the snapshot to the second node 504 for storage. The data set included in the snapshot of the VSD, which may include not only the VSD object 355 but also the data referenced by the VSD object 355, may be quite large and can take some time to transfer from the first node 502 to the second node 504. For example, the first node 502 and the second node 504 may be located at different physical locations and configured to communicate over a network such as the Internet. The large data set that makes up the captured snapshot may take minutes, hours, or even days to transfer to the second node 504 over the Internet. The snapshot is broken down into data packets in the first node 502 that are transmitted via a TCP/IP protocol over the network and reassembled into the snapshot at the second node 504.

At a later point in time, a second operation to capture a second snapshot 512 of the VSD may be initiated in the first node 502. The first node 502 captures another snapshot of the VSD and transmits the second snapshot to the second node 504 for storage. The second snapshot may be smaller than the first snapshot because the second snapshot may only include data that has changed in the VSD since the first snapshot was captured. Since the second snapshot is likely to be smaller than the first snapshot, the second snapshot may be transferred to the second node 504 in less time than it took to transfer the first snapshot to the second node 504. Similarly, a third operation to capture a third snapshot 513 of the VSD may be initiated in the first node 502. The first node 502 captures yet another snapshot of the VSD and transfers the third snapshot to the second node 504.

Figure 5B:
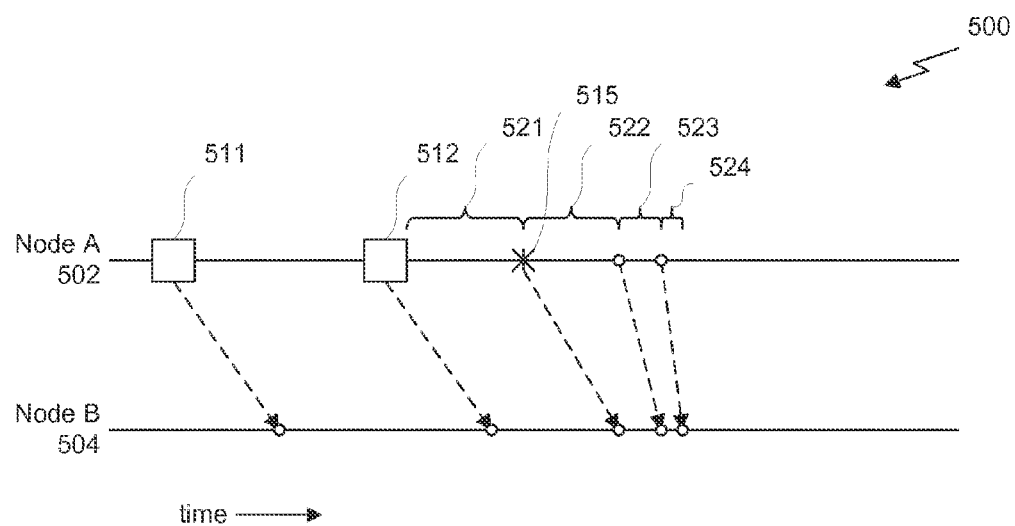
FIG. 5B is a conceptual diagram of the system configured to implement a migration of the VSD from the first node to the second node using previously captured snapshots, in accordance with one embodiment.

FIG. 5B is a conceptual diagram of the system 500 configured to implement a migration of the VSD from the first node 502 to the second node 504 using previously captured snapshots, in accordance with one embodiment. Conventionally, migration of a virtual machine or portions of a virtual machine, such as a VSD, from one node to another node are performed by halting the virtual machine on one node, copying the memory comprising the virtual machine from that node to a new node, and then executing the virtual machine on the new node. It will be appreciated that the operation of migrating a VSD across a network could take a significant amount of time, during which the virtual machine is halted. Again, migration can be used to move an entire system (i.e., virtual machine) from one node to another node, or migration can be used to move only a portion of the system (i.e., a storage device associated with the virtual machine) from one node to another node.

In one embodiment, the hypervisor 320 for a node receives a request to migrate a VSD from that node to another node in the cluster 200. The request may be generated by a process configured to manage the cluster 200 or the request may be generated by a system manager using software executing on that node or another node. The request may include a pointer to a different node that is the target node for the migration operation.

In one embodiment, an operation to perform migration of a VSD is configured to utilize one or more snapshots of the VSD that are stored on the target node. For example, as shown in FIG. 5B, a first snapshot 511 and a second snapshot 512 of a VSD are captured on a first node 502 at two points in time. The system 500 may be configured to store these snapshots on a second node 504 as a backup of the VSD in case the first node 502 fails. At a later point in time, the first node 502 receives a request 515 to migrate the VSD from the first node 502 to the second node 504. In order to perform the migration, the first node 502 selects a previously captured snapshot of the VSD that is already stored on the second node 504. In this case, the previously captured snapshot is the second snapshot 512.

Again, conventionally, systems would receive a request to migrate the resource from a first node to the second node, halt the operations of the resource (such as by making the resource read-only or halting the virtual machine associated with the resource), and then copy the entire resource to the second node. In contrast, the system 500 can reduce the amount of data that is required to be copied from the first node 502 to the second node 504 to complete a migration by utilizing the data that has already been copied as part of the backup system using snapshots. The first node 502 is configured to track any changes made to the VSD since the last snapshot was captured and collect these changes in a data structure that represents the set of changes. The first node 502 may track these changes in order to capture another subsequent snapshot at a later point in time. The set of changes that are collected may also be used in order to migrate the VSD from the first node 502 to the second node 504.

For example, the first node 502 tracks the changes to the VSD during a first period of time 521 after capturing the second snapshot 512 and collects the set of changes in a data structure that represents the modifications made to the VSD. When the request 515 to migrate the VSD is received by the first node 502, the first node 502 may send a request to the second node 504 to create a new VSD on the second node 504 using the local copy of the second snapshot 512 (i.e., the copy previously transmitted to the second node 504). In one embodiment, the second node 504 may create the new VSD by creating a copy of the VSD object 355 in a memory 315 of the second node 504 and copying the data referenced by the second VSD into one or more RSDs 214 associated with the second node 504. After the new VSD has been created and matches the state of the VSD at the time the second snapshot 512 was captured, the first node 502 may then transmit the data structure that represents the modifications made to the VSD during the first period of time 521 to the second node 504. The second node 504 receives the data structure and may utilize the data structure to update the local copy of the VSD on the second node 504 to match the remote copy of the VSD on the first node 502 at a particular point in time. Once the second node 504 has updated the local copy of the VSD, the local copy of the VSD matches the remote copy of the VSD at a point in time when the request 515 to migrate the VSD was received. Creating a local copy of the VSD on the second node 504 using the second snapshot 512 is significantly faster than transferring a current copy of the VSD to the second node 504 over a network. By only transmitting the changes to the VSD since the previous snapshot was captured over the network, the migration of the VSD may reduce the required bandwidth when compared to conventional systems that simply copy the entire contents of the resource from one node to another node.

It will be appreciated that, in one embodiment, when the request 515 to migrate the VSD to the second node 504 is received, the first node 502 may mark the VSD as read-only to prevent any additional changes to the VSD from happening after the migration operation is started. Because of the reduction in data being transmitted over the network, the time it takes to migrate the VSD to the second node 504 is reduced and having the VSD be put into a read-only protection mode may not be as much of an issue.

However, even reducing the time to perform a migration may not be enough in all circumstances and a user may not want to disable the VSD while the migration is taking place. In another embodiment, the VSD may be maintained in a normal operating state (i.e., at least one process has read-write permissions for the VSD) that allows additional operations to be performed while the migration is on-going. In other words, processes on the first node 502 may be allowed to continue to write data to the VSD on the first node 502 even after the migration is started. As also shown in FIG. 5B, a second duration of time 522 has elapsed in the time it takes to transmit the set of changes collected during the first duration of time 521 to the second node 504. The second duration of time 522 corresponds to a timeframe required to transmit the data structure to the second node 504 via the network. The second duration of time 522 may not be insignificant and it will be appreciated that additional changes to the VSD may be made during this time by the processes running on the first node 502. Once the first set of changes has been transmitted to the second node 504, the first node 502 determines whether any additional changes have been collected during the second duration of time 522. If any changes have been collected, then the first node 502 will need to transmit a second set of changes to the second node 504 so that the local copy of the VSD on the second node 504 can be updated. This procedure can be repeated a number of times until there are no changes made to the VSD during the time it takes to transmit the previous set of changes to the second node 504. If no additional changes are made during that time, then the migration is complete and the resource, such as the virtual machine on the first node 502, may be halted and operations may be transferred to the second node 504.

In another embodiment, the first node 502 may repeatedly transmit the changes to the second node 504 until the set of changes collected while transmitting the previous set of changes to the second node 504 is below a threshold value. If the set of changes is below a threshold value (i.e., the size of the data structure that represents the modifications to the VSD is below some threshold value), then the first node 502 may put the VSD into a protective mode to prevent any additional changes to be made to the VSD. Then, the first node 502 may transmit the last set of changes to the second node 504 to complete the migration operation.

For example, as shown in FIG. 5B, the second set of changes is collected during the second duration of time 522 and transmitted to the second node 504 during a third duration of time 523. The size of the data structure storing the second set of changes may be larger than the threshold value, so the VSD remains in a normal operating mode. During the third duration of time 523, a third set of changes is collected. The size of the data structure storing the third set of changes may be below the threshold value such that the first node 502 places the VSD in a protected operating mode that prevents any further modification to the VSD. The third set of changes is then transmitted to the second node 504 during a fourth duration of time 524 to complete the migration operation.

In yet another embodiment, the migration operation may be bounded such that if the migration operation hasn't completed after a set period of time (i.e., a timeout period), then the VSD may be placed in a protected operating mode such that the migration operation can be completed. It will be appreciated that if the first node 502 attempts to make too many changes to the VSD, then the set of changes may never be smaller than the threshold value and the migration operation may not be able to be completed without this mechanism in place. The timeout period may be configured as a constant amount of time, such as 1 hour, or may be variable based on various characteristics. For example, if multiple sets of changes are not decreasing in size, the timeout period may be decreased because this may indicate that processes are making too many changes to the VSD to finish the migration. However, if each subsequent set of changes are decreasing in size, then the timeout period may be increased to allow for the migration to complete without an interruption to the resource. In another embodiment, the timeout period may be set based on the size of the resource being migrated. For example, the timeout period for a VSD with a capacity of 1 GB of data may be shorter than the timeout period for a VSD with a capacity of 10 GB of data.

Figure 6A:
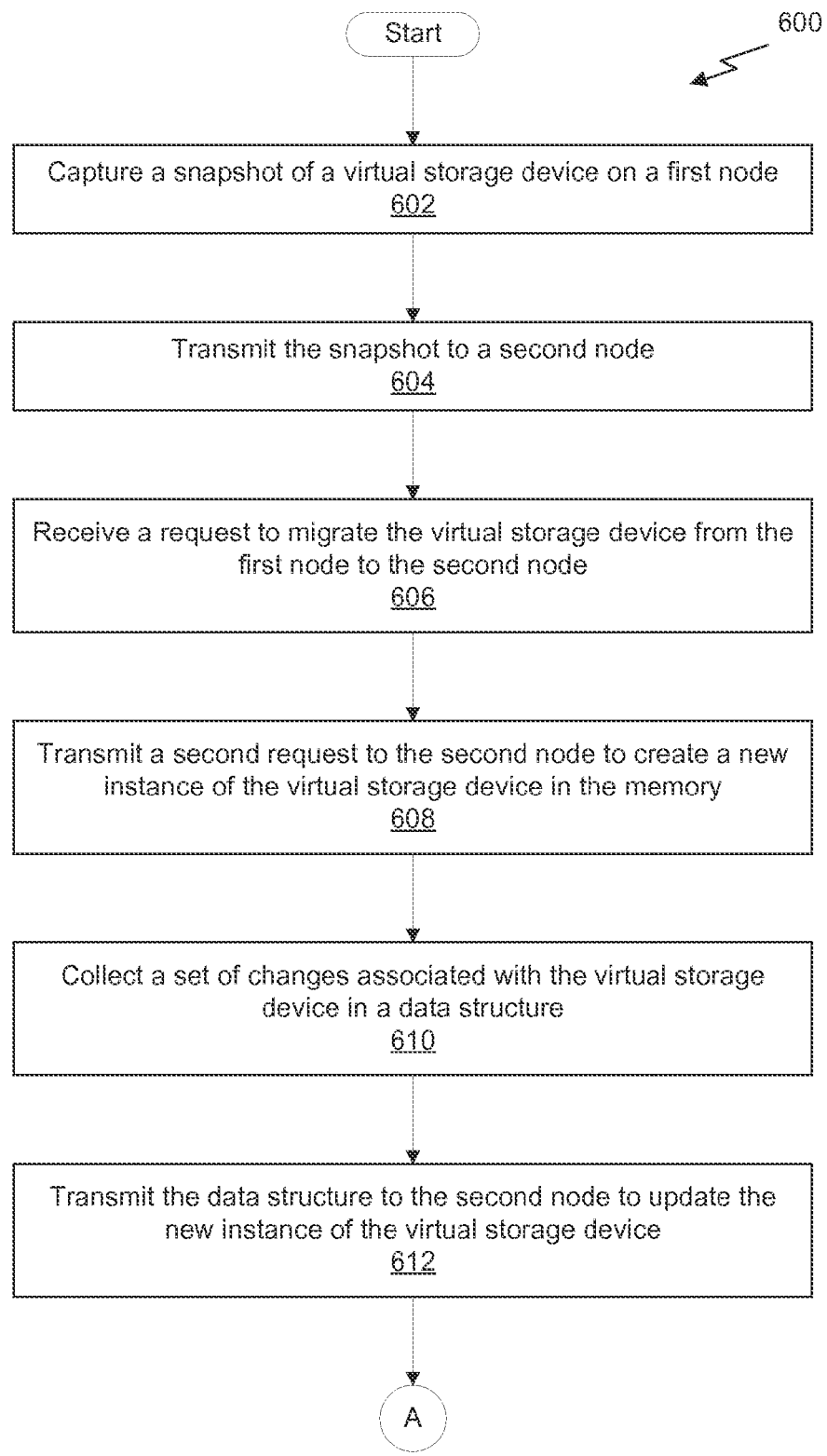
FIGS. 6A & 6B illustrate a flowchart of a method for migrating a VSD from a first node to a second node, in accordance with another embodiment.
Figure 6B:
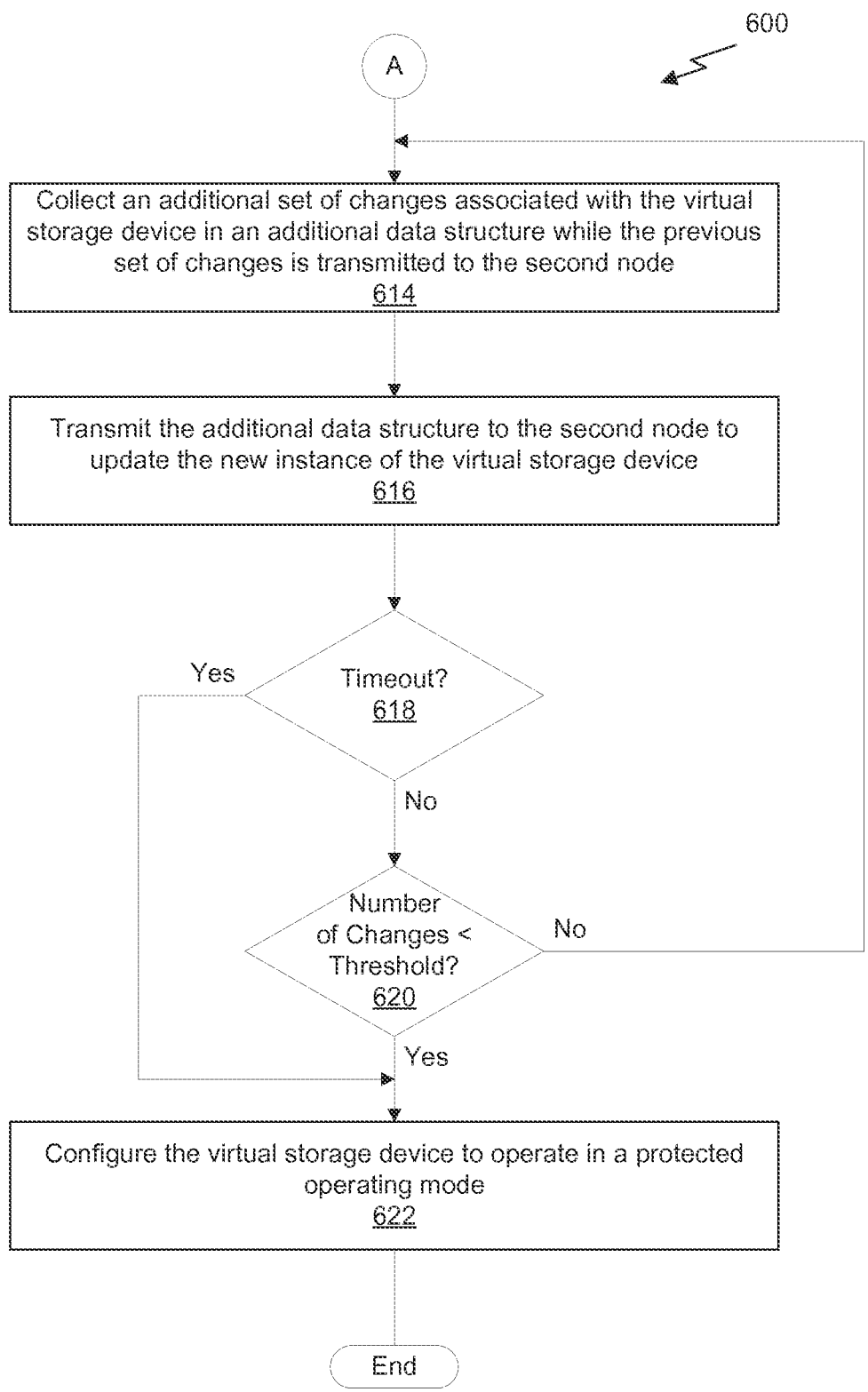

FIGS. 6A & 6B illustrate a flowchart of a method 600 for migrating a VSD from a first node 502 to a second node 504, in accordance with another embodiment. Although the method is described in the context of a program executed by a processor, the method may also be performed by custom circuitry or by a combination of custom circuitry and a program. At step 602, the first node 502 captures a snapshot of a VSD. At step 604, the first node 502 transmits the snapshot to the second node 504 to be stored in a memory (e.g., shared memory 315 or an RSD 214) associated with the second node 504. At step 606, the first node 502 receives a request to migrate the VSD from the first node 502 to the second node 504.

At step 608, the first node 502 transmits a second request to the second node 504 to create a new instance of the VSD. In response to receiving the second request, the second node 504 is configured to generate a new instance of the VSD object 355 in a memory 315 of the second node 504 based on the snapshot of the VSD stored in the memory. The second node 504 may also copy data included with the snapshot into one or more RSDs 214 of the second node 504. At step 610, the first node 502 collects a set of changes associated with the VSD in a data structure. The set of changes represents any modifications made to the VSD since the snapshot was captured. It will be appreciated that while snapshots are collected, the first node 502 tracks modifications made to the VSD even before the request to migrate the VSD to the second node is received. At step 612, the first node 502 transmits the data structure to the second node 504 to update the new instance of the VSD. The second node 504 is configured to unpack the set of changes in the data structure and modify the new instance of the VSD based on the set of changes such that the new instance of the VSD in the second node 504 matches the original VSD in the first node 502 at a point in time that the request to migrate the VSD was received.

At step 614, the first node 502 collects an additional set of changes associated with the VSD in an additional data structure while the previous set of changes is transmitted to the second node 504. Because the first node 502 and the second node 504 are connected via a network, transmitting the data structure to the second node takes time. In order to keep the VSD operational on the first node 502 during this time, any additional changes made to the VSD should be tracked and collected to send to the second node 504 once the previous set of changes has been received by the second node 504.

At step 616, the first node 502 transmits the additional data structure to the second node to update the new instance of the VSD. The second node 504 is configured to unpack the set of changes in the additional data structure and modify the new instance of the VSD based on the additional set of changes such that the new instance of the VSD in the second node 504 matches the original VSD in the first node 502 at a point in time when the first node 502 had completed transmission of the previous set of changes to the second node 504.

At step 618, the first node 502 determines whether a period of time has elapsed since the start of the migration operation that is greater than a timeout period. The first node 502 may check the period of time against the timeout period before beginning the transmission of the additional data structure. If the period of time is not greater than the timeout period, then, at step 620, the first node 502 determines whether the size of the data structure storing the additional set of changes is less than a threshold value. Again, the threshold value may represent a size (in bytes) of the data structure used to store the additional set of changes. Alternatively, any other test for determining whether the size of the data structure storing the additional set of changes is small (e.g., whether the time required to transmit the data structure storing the additional set of changes to the second node 504 is below a threshold value) may be applied by the first node 502. If the size of the data structure storing the additional set of changes is not less than the threshold value, then the method 600 returns to step 614 where another iteration of collecting changes and transmitting changes to the second node 504 is performed. However, if the size of the data structure storing the additional set of changes is less than the threshold value, then, at step 622, the first node 502 configures the VSD to operate in a protected operating mode. In one embodiment, the first node 502 changes the permissions of any processes that have access to the VSD to be read-only. The protected operating mode prevents any additional changes from being made to the VSD while the last set of changes is transmitted to the second node 504.

Returning to step 618, if the period of time is greater than the timeout period, then the method 600 proceeds directly to step 622, described above, and no additional iterations of collecting changes and transmitting changes to the second node 504 are performed. Once the VSD is configured to operate in the protected operating mode and the last set of changes collected by the first node 502 has been transmitted to the second node 504 and applied to the new instance of the VSD, the migration operation is complete. Once the migration operation is complete, the VSD in the first node 502 may be deleted and the VSD may be unmapped from any virtual machines on the first node 502. In addition, any memory 315 allocated to the VSD in the first node 502 may be freed or overwritten with other data.

Figure 7:
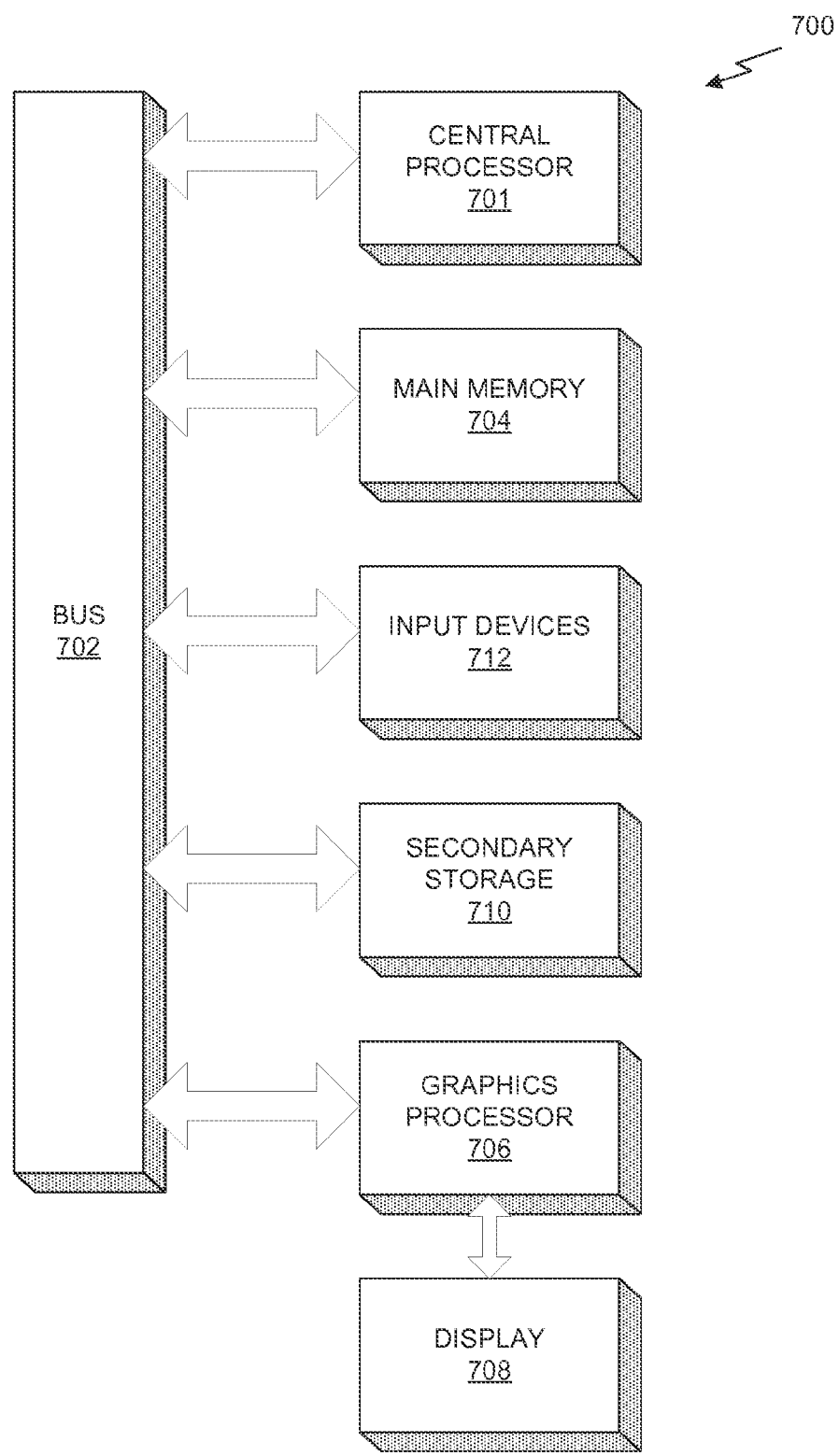
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. The system 700 may comprise a node 210 of the cluster 200. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving, at a first node, a first request to initiate a migration operation that migrates a resource from the first node to a second node;
transmitting a second request from the first node to the second node to create a new instance of the resource, wherein the second node, in response to receiving the second request, generates the new instance of the resource in a memory associated with the second node based on a snapshot of the resource captured by the first node and stored in the memory associated with the second node at a previous point in time, wherein the first request is received by the first node after the previous point in time;
collecting, in the first node, a set of changes associated with the resource in a data structure, wherein the set of changes represents any modifications to the resource since the previous point in time during which the snapshot was captured;
transmitting the data structure that includes the set of changes to the second node, wherein the second node is configured to update the new instance of the resource based on the set of changes such that the new instance of the resource on the second node matches the resource on the first node,
determining that a period of time that has elapsed since the start of the migration operation is greater than a timeout period; and
configuring the resource to operate in a protected operating mode,
wherein the timeout period is set dynamically during the migration operation based on characteristics of the migration operation.

2. The method of claim 1, wherein the resource comprises a virtual storage device.

3. The method of claim 2, wherein the snapshot comprises an additional data structure that represents a state of the virtual storage device at a particular point in time.

4. The method of claim 2, further comprising:
collecting an additional set of changes associated with the virtual storage device in an additional data structure while the previous set of changes is transmitted to the second node; and
transmitting the additional data structure that includes the additional set of changes to the second node.

5. The method of claim 4, further comprising:
determining whether the additional set of changes is below a threshold value; and
if the additional set of changes is below the threshold value, then configuring the virtual storage device to operate in a protected operating mode, or
if the additional set of changes is not below the threshold value, then repeating the steps of collecting one or more additional sets of changes associated with the virtual storage device in one or more additional data structures and transmitting the one or more additional data structures to the second node.

6. The method of claim 5, wherein placing the virtual storage device into the protected operating mode comprises modifying the permissions of the virtual storage device such that the data on the virtual storage device is marked as read-only.

7. The method of claim 4, wherein setting the timeout period dynamically comprises:
decreasing the timeout period if the additional set of changes is larger than the previous set of changes; or
increasing the timeout period if the additional set of changes is smaller than the previous set of changes.

8. The method of claim 2, further comprising freeing memory associated with the virtual storage device on the first node once the new instance of the virtual storage device on the second node matches the virtual storage device on the first node.

9. The method of claim 1, wherein transmitting the data structure to the second node comprises generating a number of packets in a memory associated with the first node and transmitting the packets to the second node via a network, wherein each packet includes at least a portion of the data structure.

10. The method of claim 1, wherein the resource comprises a virtual machine.

11. A non-transitory computer-readable storage medium storing instructions that, when executed by a processor, cause the processor to perform steps comprising:
receiving, at a first node, a first request to migrate a resource from the first node to a second node;
transmitting a second request from the first node to the second node to create a new instance of the resource, wherein the second node, in response to receiving the second request, generates the new instance of the resource in a memory associated with the second node based on a snapshot of the resource captured by the first node and stored in the memory associated with the second node at a previous point in time, wherein the first request is received by the first node after the previous point in time;
collecting, in the first node, a set of changes associated with the resource in a data structure, wherein the set of changes represents any modifications to the resource since the previous point in time during which the snapshot was captured;
transmitting the data structure that includes the set of changes to the second node, wherein the second node is configured to update the new instance of the resource based on the set of changes such that the new instance of the resource on the second node matches the resource on the first node;
determining that a period of time that has elapsed since the start of the migration operation is greater than a timeout period; and
configuring the resource to operate in a protected operating mode,
wherein the timeout period is set dynamically during the migration operation based on characteristics of the migration operation.

12. The computer-readable storage medium of claim 11, wherein the resource comprises a virtual storage device.

13. The computer-readable storage medium of claim 12, the steps further comprising:
collecting an additional set of changes associated with the virtual storage device in an additional data structure while the previous set of changes is transmitted to the second node; and
transmitting the additional data structure that includes the additional set of changes to the second node.

14. The computer-readable storage medium of claim 13, the steps further comprising:
determining whether the additional set of changes is below a threshold value; and
if the additional set of changes is below the threshold value, then configuring the virtual storage device to operate in a protected operating mode, or if the additional set of changes is not below the threshold value, then repeating the steps of collecting one or more additional sets of changes associated with the resource in one or more additional data structures and transmitting the one or more additional data structures to the second node.

15. A system comprising:
a first node comprising a processor and a memory; and
a second node comprising a second processor and an additional memory,
wherein the first node is configured to:
  receive a first request to migrate a resource from the first node to the second node,
  transmit a second request to the second node to create a new instance of the resource,
  collect a set of changes associated with the resource in a data structure, wherein the set of changes represents any modifications to the resource since a previous point in time; and
  transmit the data structure that includes the set of changes to the second node,
  determine that a period of time that has elapsed since the start of the migration operation is greater than a timeout period, and
  configure the resource to operate in a protected operating mode,
  wherein the timeout period is set dynamically during the migration operation based on characteristics of the migration operation;
and wherein the second node is configured to:
  in response to receiving the second request, generate the new instance of the resource in the additional memory based on a snapshot of the resource captured by the first node and stored in the additional memory at the previous point in time, wherein the first request is received by the first node after the previous point in time, and
  update the new instance of the resource based on the set of changes such that the new instance of the resource on the second node matches the resource on the first node.

16. The system of claim 15, wherein the resource comprises a virtual storage device.

17. The system of claim 16, wherein the first node is further configured to:
  collect an additional set of changes associated with the virtual storage device in an additional data structure while the previous set of changes is transmitted to the second node; and
  transmit the additional data structure that includes the additional set of changes to the second node.

18. The system of claim 17, wherein the first node is further configured to:
  determine that a period of time that has elapsed since the start of the migration operation is greater than a timeout period; and
  configure the virtual storage device to operate in a protected operating mode.

19. The system of claim 17, wherein the first node is further configured to:
  determine whether the additional set of changes is below a threshold value; and
  if the additional set of changes is below the threshold value, then configure the virtual storage device to operate in a protected operating mode, or
  if the additional set of changes is not below the threshold value, then repeat the steps of collecting one or more additional sets of changes associated with the virtual storage device in one or more additional data structures and transmitting the one or more additional data structures to the second node.

20. The system of claim 15, wherein the first node is connected to the second node via a network.

* * * * *